US011341779B2

United States Patent
Kawase et al.

(10) Patent No.: US 11,341,779 B2
(45) Date of Patent: May 24, 2022

(54) INFORMATION PROCESSING APPARATUS, CONTROL METHOD, AND PROGRAM

(71) Applicant: NEC CORPORATION, Tokyo (JP)

(72) Inventors: Nobuaki Kawase, Tokyo (JP); Yumiko Tomizuka, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/636,264

(22) PCT Filed: Aug. 2, 2018

(86) PCT No.: PCT/JP2018/029024
§ 371 (c)(1),
(2) Date: Feb. 3, 2020

(87) PCT Pub. No.: WO2019/026996
PCT Pub. Date: Feb. 7, 2019

(65) Prior Publication Data
US 2020/0372274 A1 Nov. 26, 2020

(30) Foreign Application Priority Data

Aug. 4, 2017 (JP) .............................. JP2017-151377

(51) Int. Cl.
*G06V 40/50* (2022.01)
*G06V 40/16* (2022.01)

(52) U.S. Cl.
CPC ............ *G06V 40/50* (2022.01); *G06V 40/166* (2022.01); *G06V 40/173* (2022.01)

(58) Field of Classification Search
CPC ........... G06K 9/00926; G06K 9/00255; G06K 9/00295; G06K 9/00288; G06K 9/00671;
(Continued)

(56) References Cited

U.S. PATENT DOCUMENTS 7,504,942 B2 * 3/2009 Marman .......... G08B 13/19686
340/541
8,155,392 B1 * 4/2012 McWilliams ............ G01G 1/20
382/115
(Continued)

FOREIGN PATENT DOCUMENTS

JP 11-175633 A 7/1999
JP 2004-318550 A 11/2004
(Continued)

OTHER PUBLICATIONS

English translation achieved from Google Patents for JP H11-175633 Submitted in IDS by applicants on Feb. 3, 2020 (Year: 1999).*

(Continued)

*Primary Examiner* — Nimesh Patel
(74) *Attorney, Agent, or Firm* — Sughrue Mion, PLLC

(57) ABSTRACT

An information processing apparatus (2000) receives a request for registration of a substitute person. The request includes at least a face image of the substitute person who picks up a picked-up target as a substitute. The information processing apparatus (2000) registers the substitute person using the face image of the substitute person shown in the request. In addition, the information processing apparatus (2000) performs notification related to registration of the substitute person with respect to an authorized picking-up person associated with the picked-up target. The authorized picking-up person is determined using an authorized picking-up person information storage unit that stores the picked-up target in association with the authorized picking-up person of the picked-up target.

38 Claims, 13 Drawing Sheets

(58) Field of Classification Search
CPC ........... G06K 9/00355; G06K 9/00838; G06K 9/0057; G06K 9/00791; G06K 9/6277; G06K 9/00221; G06K 9/00248; G06K 9/00281; G06K 9/00597; G06K 9/00677; G06K 9/00832; G06K 9/00892; G06K 9/00302; G06K 9/00778; G06K 9/00342; G06K 9/00624; G06K 9/00087; G06K 9/00362; G06K 9/222; G06K 9/6267; G06K 9/66; G06Q 50/10; G06Q 50/01; G06Q 20/382; G06Q 20/4014; G06Q 20/389; G06Q 20/40145; G06Q 20/40; G06Q 20/401; G06Q 20/4016; G06Q 30/0269; G06Q 50/265; G06Q 20/2295; G06Q 20/32; G06Q 20/384; H04W 52/0254; H04W 48/08; H04W 4/029; H04W 52/0258; H04W 52/0267; H04W 12/08; H04W 4/02; H04W 12/06; H04W 64/00; H04W 4/38; H04W 12/068; H04W 12/065; H04W 12/77; H04L 2012/2841; H04L 2012/2849; H04L 67/22; H04L 63/20; H04L 63/08; H04L 63/10; H04L 63/0861; G06T 11/206; G06T 11/001; G06T 11/20; G06T 1/00; G06T 11/60; G06T 9/40; G06T 7/62; G06T 7/215; G07C 9/257; G07C 9/26; G07C 9/30; G07C 9/38; G07C 2209/02; G07C 9/00571; G07C 9/00896; G07C 9/22; G07C 9/28; G07C 11/00; G07C 9/253; G07C 2009/00769; G07C 9/00309; G07C 9/37; G07C 9/20; G07C 9/21; G07C 9/32; G08B 25/008; G08B 15/00; G08B 21/0269; G08B 21/0272; G08B 21/0277; G08B 13/19613; G08B 21/0261; G08B 21/0202; G08B 21/22; G06N 5/02; G06N 20/00; G06N 5/022; G06N 5/025; G06N 5/04; G06N 3/0454; G06N 20/10; G06N 20/20; G06N 3/004; G06N 3/006; G06N 5/003; G06N 7/005; G06N 7/023; G06F 21/44; G06F 21/55; G06F 21/554; G06F 21/35; G06F 21/46; G06F 2221/2111; G06F 21/53

See application file for complete search history.

(56) References Cited

U.S. PATENT DOCUMENTS

| | | | |
|---|---|---|---|
| 2002/0071033 A1* | 6/2002 | Gutta | G07C 9/37 348/143 |
| 2004/0083371 A1 | 4/2004 | Algazi et al. | |
| 2013/0329059 A1* | 12/2013 | Uchikoshi | G06K 9/036 348/207.1 |
| 2014/0122609 A1 | 5/2014 | Sakata | |
| 2015/0135280 A1* | 5/2015 | Janzer | H04L 63/10 726/4 |

FOREIGN PATENT DOCUMENTS

| | | |
|---|---|---|
| JP | 2006-505045 A | 2/2006 |
| JP | 2015-183356 A | 10/2015 |
| JP | 2018-081449 A | 5/2018 |
| WO | 2013/008726 A1 | 1/2013 |

OTHER PUBLICATIONS

International Search Report for PCT/JP2018/029024 dated Oct. 30, 2018 [PCT/ISA/210].
Written Opinion for PCT/JP2018/029024 dated Oct. 30, 2018 [PCT/ISA/237].

* cited by examiner

FIG. 4

| PICKED-UP TARGET | SUBSTITUTE PERSON |
|---|---|
| r001 | a001.jpg |
| r002 | a002.jpg |
| r003 | a003.jpg |
| ... | ... |

INFORMATION PROCESSING APPARATUS, CONTROL METHOD, AND PROGRAM

CROSS REFERENCE TO RELATED APPLICATIONS

This application is a National Stage of International Application No. PCT/JP2018/029024 filed Feb. 8, 2018, claiming priority based on Japanese Patent Application No. 2017-151377 filed Aug. 4, 2017.

TECHNICAL FIELD

The present invention relates to a technology for assisting pickup of a person or an object.

BACKGROUND ART

A person, baggage, or the like such as a child left at a nursery facility or a reserved product may be picked up. For example, Patent Document 1 is a related document disclosing a system that assists pickup of a person or an object. Patent Document 1 discloses a childcare system that is used at a childcare center that takes care children. In a case where a child is left at a childcare center, the childcare system registers a feature of a face of the child in association with a feature of a face of a parent using an image in which the child and the parent are imaged. In a case where the child is released, the childcare system determines whether or not it is a registered combination using the image in which the child and the parent are imaged.

RELATED DOCUMENT

Patent Document

[Patent Document 1] Japanese Patent Application Publication No. H11-175633

SUMMARY OF THE INVENTION

Technical Problem

A left object or a reserved object (hereinafter, a picked-up target) is not necessarily picked up by a person who leaves or reserves the picked-up target. That is, the pickup may be performed by a person (hereinafter, a substitute person) who picks up the picked-up target as a substitute. For example, in a case where a mother leaves a child at a nursery facility, it is considered that a grandmother comes to fetch the child instead of the mother. The technology in Patent Document 1 does not consider the pickup performed by the substitute person.

The present invention is conceived in view of the above problem. One object of the present invention is to provide a technology for assisting pickup of a picked-up target by a substitute person.

Solution to Problem

An information processing apparatus of the present invention includes (1) a registration unit that receives a request including a face image of a substitute person who picks up a picked-up target as a substitute, and registers the substitute person in association with the picked-up target, and (2) a notification unit that determines an authorized picking-up person associated with the picked-up target to be associated with the substitute person using an authorized picking-up person information storage unit which stores the picked-up target in association with the authorized picking-up person of the picked-up target, and transmits a notification related to registration of the substitute person to the authorized picking-up person.

A control method of the present invention is executed by a computer. The control method includes (1) a registration step of receiving a request including a face image of a substitute person who picks up a picked-up target as a substitute, and registering the substitute person in association with the picked-up target, and (2) a notification step of determining an authorized picking-up person associated with the picked-up target to be associated with the substitute person using an authorized picking-up person information storage unit which stores the picked-up target in association with the authorized picking-up person of the picked-up target, and transmitting a notification related to registration of the substitute person to the authorized picking-up person.

A program of the present invention causes a computer to execute each step of the control method of the present invention.

Advantageous Effects of Invention

According to the present invention, a technology for assisting pickup of a picked-up target by a substitute person is provided.

BRIEF DESCRIPTION OF THE DRAWINGS

The above object and other objects, features, and advantages will become more apparent from exemplary example embodiments set forth below and the following drawings appended thereto.

FIG. 4 is a diagram illustrating a structure of substitute person information in a table format.

DESCRIPTION OF EMBODIMENTS

Hereinafter, example embodiments of the present invention will be described using the drawings. Note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

Example Embodiment 1

Summary

Figure 1:
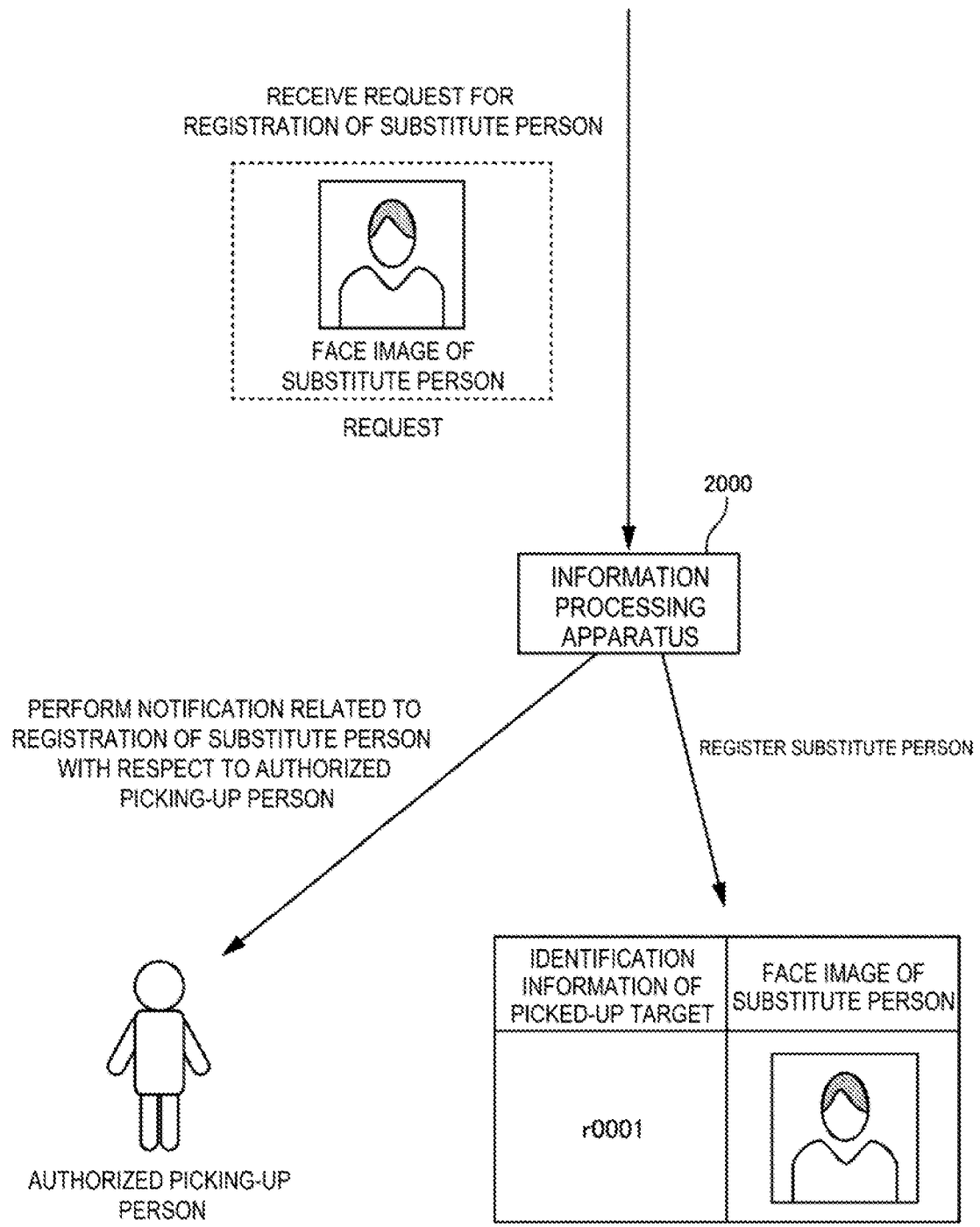
FIG. 1 is a diagram for describing a summary of operation of an information processing apparatus of Example Embodiment 1.

FIG. 1 is a diagram for describing a summary of operation of an information processing apparatus 2000 of Example Embodiment 1. The operation of the information processing apparatus 2000 in the following description is an illustration for easy understanding of the information processing apparatus 2000. The operation of the information processing apparatus 2000 is not limited to the following example. Details and variations of the operation of the information processing apparatus 2000 will be described below.

The information processing apparatus 2000 is an apparatus used in registration of a substitute person who picks up a picked-up target as a substitute. The "picked-up target" is any object such as a person, an animal, or baggage. The act of "pickup" includes various acts of picking up the object. For example, the pickup includes an act of picking up a left person, baggage, or the like and an act of picking up a reserved product.

For example, the act of picking up the left person or baggage includes pickup of a child left at a nursery facility, pickup of an elderly person left at a nursing home, pickup of a pet left at a pet hotel, pickup of a device or the like sent for repairing, pickup of clothes or the like sent for cleaning, pickup of parcel baggage at a store such as a convenience store, and pickup of post at a counter of a post office or the like. For example, the act of picking up the reserved product or the like includes pickup at a store for a product that is purchased and is waited for to be delivered to the store, and purchase and pickup of a product reserved to be purchased at the store.

The information processing apparatus 2000 receives a request for registration of the substitute person. The request includes at least a face image of the substitute person who picks up the picked-up target as a substitute. The information processing apparatus 2000 registers the substitute person using the face image of the substitute person shown in the request.

In order to register the substitute person, it is necessary to determine the picked-up target that is picked up by the substitute person as a substitute. The picked-up target is determined using information included in the request. For example, in addition to the face image of the substitute person, the request includes identification information of the picked-up target. In this case, the substitute person is registered using the identification information of the picked-up target included in the request and the face image of the substitute person included in the request. Note that another method of determining the picked-up target will be described later.

In addition, the information processing apparatus 2000 performs notification related to the registration of the substitute person with respect to an authorized picking-up person associated with the picked-up target. The authorized picking-up person is a person who is authorized to pick up the picked-up target before the substitute person is registered. For example, the authorized picking-up person is a person who leaves a person, a pet, or the like to be picked up at a facility or the like, a person who sends a device to be picked up for repairing, a person who sends clothing or the like to be picked up for cleaning, a recipient of a parcel or post to be picked up, or a person who reserves a product to be picked up. The substitute person is able to be described as a person who is other than the authorized picking-up person and is permitted to pick up the picked-up target.

For example, the notification transmitted to the authorized picking-up person is a notification that informs the authorized picking-up person that the substitute person is registered in association with the picked-up target. In another example, the notification transmitted to the authorized picking-up person is a notification for inquiring whether or not to permit the registration of the substitute person to the authorized picking-up person. In the latter case, the substitute person is registered in a case where a response from the authorized picking-up person indicates that the registration of the substitute person is permitted.

Advantageous Effect

According to the information processing apparatus 2000 of the present example embodiment, the substitute person is registered using the face image of the substitute person picking up the picked-up target. Accordingly, in a case where a certain person comes to pick up the picked-up target, whether or not the person is the substitute person can be recognized and checked using the face image of the substitute person associated with the identification information of the picked-up target. Thus, occurrence of a problem of passing the picked-up target to a person who is not the substitute person can be avoided.

Furthermore, since the notification related to the registration of the substitute person is transmitted to the authorized picking-up person, the authorized picking-up person can recognize the registration of the substitute person. By doing so, it is able to avoid that pickup is substituted by a person whom the authorized picking-up person does not want to pick up the picked-up target.

Hereinafter, the information processing apparatus 2000 of the present example embodiment will be described in further detail.

<Example of Functional Configuration of Information Processing Apparatus 2000>

Figure 2:
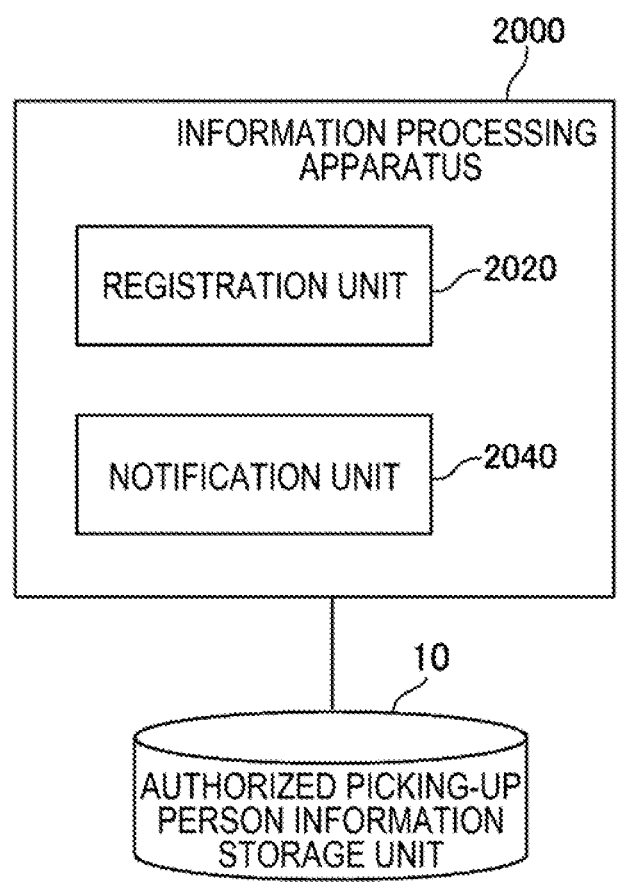
FIG. 2 is a diagram illustrating a configuration of the information processing apparatus of Example Embodiment 1.

FIG. 2 is a diagram illustrating a configuration of the information processing apparatus 2000 of Example Embodiment 1. In FIG. 2, the information processing apparatus 2000 includes a registration unit 2020 and a notification unit 2040. The registration unit 2020 receives the request including the face image of the substitute person. Furthermore, in association with the identification information of the picked-up target, the registration unit 2020 registers the substitute person who is identified by the face image included in the received request. The notification unit 2040 performs the notification related to the registration of the substitute person of the picked-up target with respect to the authorized picking-up person of the picked-up target.

Note that the notification unit 2040 acquires identification information of the authorized picking-up person from an authorized picking-up person information storage unit 10. The authorized picking-up person information storage unit 10 stores information (hereinafter, authorized picking-up person information) in which the identification information of the authorized picking-up person is associated with the identification information of the picked-up target. The authorized picking-up person information storage unit may be installed either inside or outside the information processing apparatus 2000.

<Hardware Configuration of Information Processing Apparatus 2000>

Each functional configuration unit of the information processing apparatus 2000 may be implemented by hardware (example: a hardwired electronic circuit) implementing each functional configuration unit, or may be implemented by a combination of hardware and software (example: a combination of an electronic circuit and a program controlling the electronic circuit). Hereinafter, a case where each functional configuration unit of the information processing apparatus 2000 is implemented by a combination of hardware and software will be described.

Figure 3:
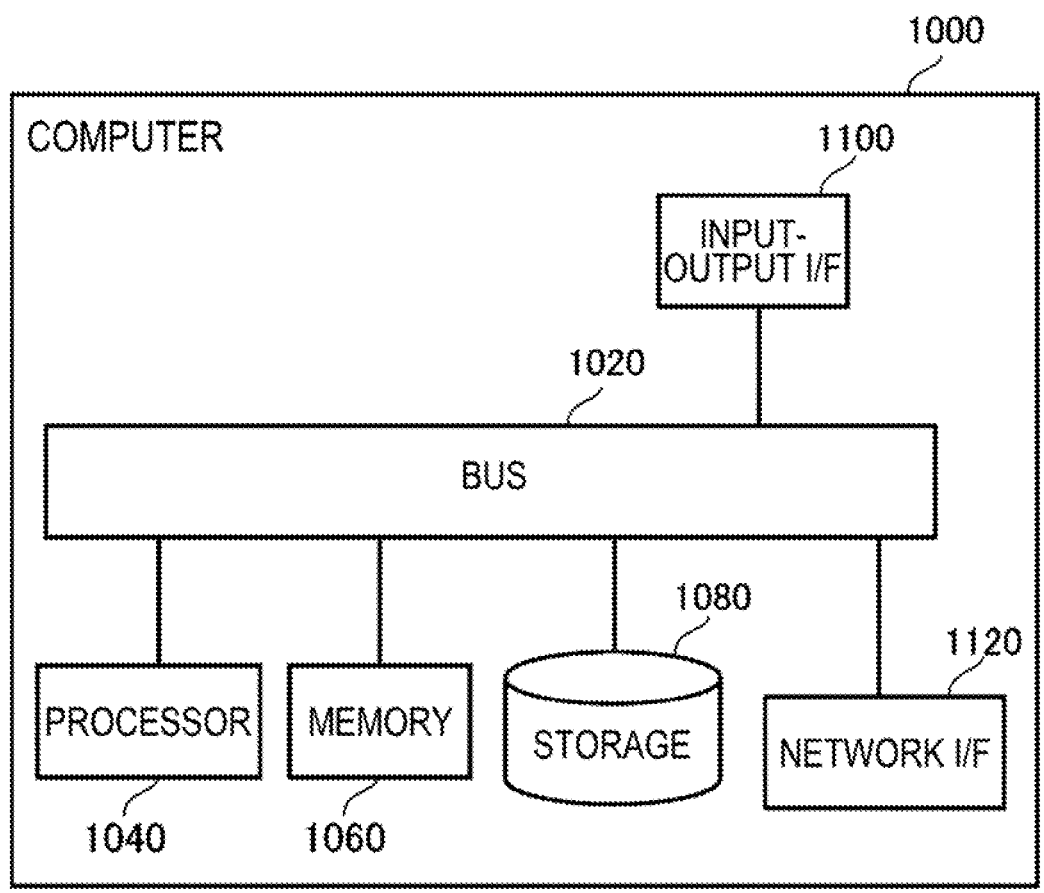
FIG. 3 is a diagram illustrating a computer for implementing the information processing apparatus.

FIG. 3 is a diagram illustrating a computer 1000 for implementing the information processing apparatus 2000. The computer 1000 is any computer. For example, the computer 1000 is a Personal Computer (PC), a server machine, a tablet terminal, or a smartphone. The computer 1000 may be a dedicated computer designed to implement the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transfer path for transmission and reception of data among the processor 1040, the memory 1060, the storage device 1080, the input-output interface 1100, and the network interface 1120. A method of connecting the processor 1040 and the like to each other is not limited to bus connection. The processor 1040 corresponds to various processors such as a Central Processing Unit (CPU) and a Graphics Processing Unit (GPU). The memory 1060 is a main storage apparatus that is implemented using a Random Access Memory (RAM) or the like. The storage device 1080 is an auxiliary storage apparatus that is implemented using a hard disk, a Solid State Drive (SSD), a memory card, a Read Only Memory (ROM), or the like. The storage device 1080 may be configured by the same hardware as hardware such as the RAM constituting the main storage apparatus.

The input-output interface 1100 is an interface for connecting the computer 1000 to input-output devices. The network interface 1120 is an interface for connecting the computer 1000 to a communication network. For example, the communication network is a Local Area Network (LAN) or a Wide Area Network (WAN). A method of connecting the network interface 1120 to the communication network may be wireless connection or may be wired connection.

The storage device 1080 stores a program module that implements each functional configuration unit of the information processing apparatus 2000. The processor 1040 implements a function corresponding to each program module by reading each program module into the memory 1060 and executing the program module. In addition, in a case where the authorized picking-up person information storage unit 10 is installed inside the information processing apparatus 2000, for example, the authorized picking-up person information storage unit 10 is implemented using the storage device 1080.

Note that the computer 1000 may be implemented using a plurality of computers. For example, the registration unit 2020 and the notification unit 2040 can be implemented by different computers. In this case, the program module stored in the storage device of each computer may be only a program module corresponding to the functional configuration unit implemented by the computer.

<Reception of Request>

The registration unit 2020 receives the request including the face image of the substitute person. The face image of the substitute person is image data that includes an image region showing a face of the substitute person.

The request is transmitted from any apparatus other than the information processing apparatus 2000. For example, the request is transmitted from a terminal (a PC, a portable terminal, or the like) possessed by the substitute person. However, the request is not necessarily transmitted from the terminal possessed by the substitute person.

There are various methods of transmitting the request to the information processing apparatus 2000. For example, the substitute person transmits the request by accessing a predetermined website from a web browser of the terminal of the substitute person and inputting information (the face image of the substitute person and the like) necessary for transmitting the request on the website. In another example, a dedicated application for transmitting the request to the information processing apparatus 2000 is installed in advance on the terminal of the substitute person. The substitute person transmits the request by inputting information necessary for transmitting the request using the dedicated application. Note that existing technologies can be used as a technology for transmitting the request including predetermined information using the website or the dedicated application and a technology for receiving the request transmitted in such a manner.

<Registration of Substitute Person>

The registration unit 2020 registers the substitute person based on the received request. Specifically, the registration unit 2020 registers the face image of the substitute person included in the received request in association with the identification information of the picked-up target.

The registration of the substitute person in association with a certain picked-up target means that information in which the picked-up target is associated with the substitute person is put into a storage unit. Hereinafter, the storage unit will be referred to as a substitute person information storage unit, and the information stored in the substitute person information storage unit will be referred to as substitute person information. The registration of the substitute person is implemented by generating the substitute person information for the substitute person and putting the substitute person information into the substitute person information storage unit. Note that the substitute person information storage unit may be installed either inside or outside the information processing apparatus 2000.

FIG. 4 is a diagram illustrating a structure of the substitute person information in a table format. The table in FIG. 4 will be referred to as a table 200. The table 200 includes two columns of a picked-up target 202 and a substitute person 204. The picked-up target 202 shows the identification information of the picked-up target. The substitute person 204 shows the face image of the substitute person.

The identification information of the picked-up target is any information that can identify the picked-up target. In a case where the picked-up target is a person, for example, the identification information of the picked-up target is an identification number, a name, a date of birth, or a mail address, or a combination thereof. In a case where the picked-up target is an animal, for example, the identification information of the picked-up target is an identification number, a name, or a date of birth, or a combination thereof. In a case where the picked-up target is an object, for example, the identification information of the picked-up target is an identification number, a product name, or a model number, or a combination thereof.

Note that in addition to the face image of the substitute person, the request received by the registration unit 2020 preferably includes various information (a name, an address, a contact address, and the like) related to the substitute person. In this case, the registration unit 2020 may include the various information related to the substitute person in the substitute person information in addition to the face image of the substitute person.

The substitute person information may be information itself included in the received request or may be generated using the received request. For example, the latter case is a case where the image data of the substitute person included in the request includes not only the face of the substitute person but also the whole body of the substitute person or a large amount of background other than the substitute person. In this case, for example, the registration unit 2020 obtains the face image of the substitute person by extracting only the image region showing the face of the substitute person, or only the image region showing the face of the substitute person and its surrounding background from the received image data. The registration unit 2020 generates the substitute person information by associating the face image with the identification information of the picked-up target.

<Notification Related to Registration of Substitute Person>

The notification unit 2040 transmits the notification related to the registration of the substitute person of the picked-up target to the authorized picking-up person of the picked-up target. As described above, for example, the notification transmitted to the authorized picking-up person is (1) the notification (hereinafter, a registration completion notification) that informs the authorized picking-up person that the substitute person is registered in association with the picked-up target, or (2) the notification (hereinafter, a registration inquiry notification) for inquiring whether or not to permit the registration of the substitute person to the authorized picking-up person. Hereinafter, examples of (1) and (2) will be described in detail.

<<Registration Completion Notification>>

For example, the registration completion notification includes information related to the picked-up target (for example, the identification information of the picked-up target) and information related to the registered substitute person (for example, the face image of the substitute person). For example, the registration completion notification is displayed on a display device of a terminal (a PC or a portable terminal) of the authorized picking-up person.

Figure 5:
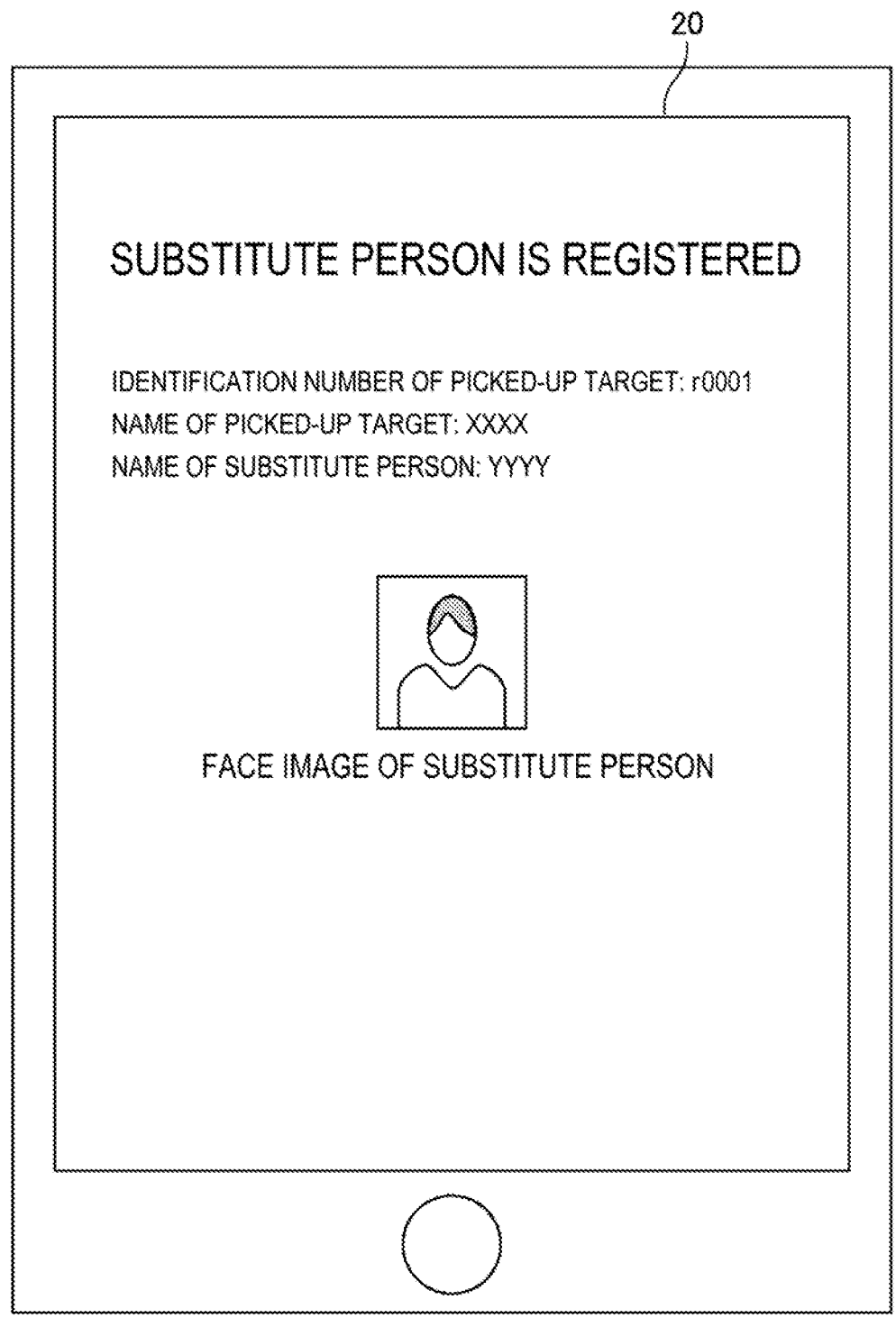
FIG. 5 is a diagram illustrating a registration completion notification displayed on a display device of a portable terminal.

FIG. 5 is a diagram illustrating the registration completion notification displayed on the display device of the portable terminal. A screen 20 is a screen showing a content of the registration completion notification. The screen 20 includes the identification number and the name of the picked-up target and the face image and the name of the substitute person.

Figure 6:
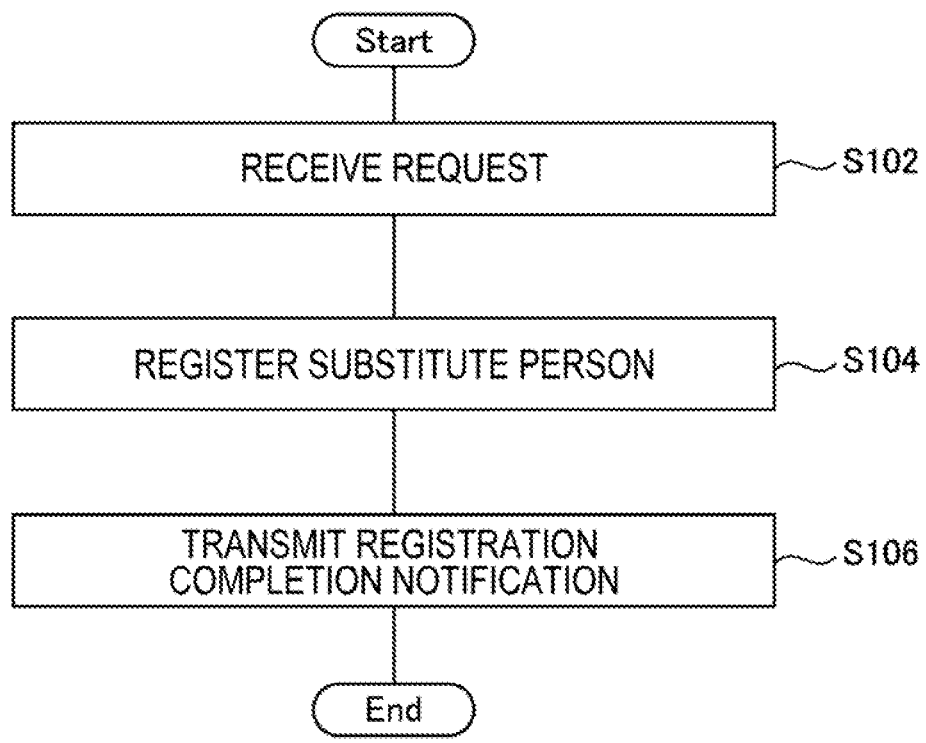
FIG. 6 is a flowchart illustrating a flow of process executed by the information processing apparatus in a case where the registration completion notification is transmitted by a notification unit.

FIG. 6 is a flowchart illustrating a flow of process executed by the information processing apparatus 2000 in a case where the registration completion notification is transmitted by the notification unit 2040. The registration unit 2020 receives the request (S102). The registration unit 2020 registers the substitute person based on the received request (S104). The notification unit 2040 transmits the registration completion notification to the authorized picking-up person (S106).

<<Registration Inquiry Notification>>

For example, the registration inquiry notification includes information related to the picked-up target and information related to the registered substitute person like the registration completion notification. Furthermore, the registration inquiry notification includes a request for a response to whether or not to permit the registration of the substitute person.

Figure 7:
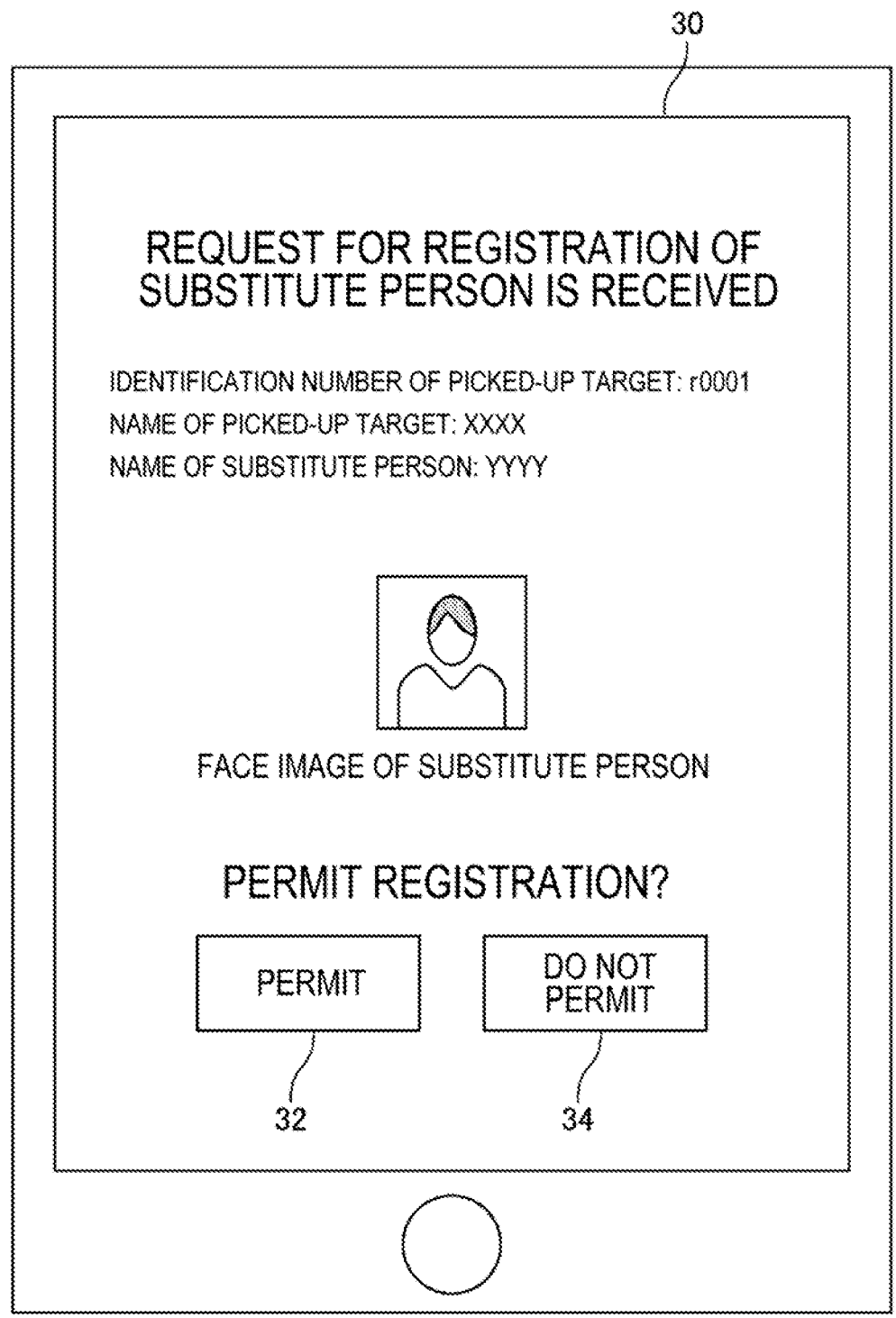
FIG. 7 is a diagram illustrating a registration inquiry notification displayed on a display device of a terminal of an authorized picking-up person.

The registration inquiry notification is received by the terminal (a PC, a portable terminal, or the like) of the authorized picking-up person and is displayed on the display device of the terminal. FIG. 7 is a diagram illustrating the registration inquiry notification displayed on the display device of the terminal of the authorized picking-up person. A screen 30 is a screen showing a content of the registration inquiry notification.

The screen 30 shows the identification number and the name of the picked-up target and the face image and the name of the substitute person. Furthermore, the screen 30 includes a button 32 and a button 34. The button 32 is a button to be selected in a case where the authorized picking-up person permits the registration of the substitute person. On the other hand, the button 34 is a button to be selected in a case where the authorized picking-up person does not permit the registration of the substitute person.

In a case where the button 32 or the button 34 is selected, information (hereinafter, approval information) that indicates whether or not to permit the registration of the substitute person is transmitted to the information processing apparatus 2000. In the above example, in a case where the button 32 is selected, the approval information indicates that the registration of the substitute person is permitted. On the other hand, in a case where the button 34 is selected, the approval information indicates that the registration of the substitute person is not permitted.

Note that the button 32 may be omitted, and the approval information may indicate that the registration of the substitute person is permitted if the button 34 is not selected for a certain amount of time. By doing so, a burden of pressing a permission button may not be required in a usage environment where it is assumed that the substitute person is highly likely to be a person appropriate for pickup. Conversely, the button 34 may be omitted, and the approval information may indicate that the registration of the substitute person is not permitted if the button 32 is not selected for a certain amount of time. By doing so, security can be improved by not permitting the registration of the substitute person unless otherwise a permission operation is explicitly performed, and a burden of pressing a non-permission button may not be required.

The registration unit 2020 receives the approval information. In a case where the approval information indicates that the registration of the substitute person is permitted, the registration unit 2020 registers the substitute person. On the other hand, in a case where the approval information indicates that the registration of the substitute person is not permitted, the registration unit 2020 does not register the substitute person.

A mechanism of transmitting the approval information to the information processing apparatus 2000 is not limited to a mechanism of using the above buttons. For example, there is a method of implementing the registration inquiry notification as a mail that includes a Unified Resource Locator (URL) for transmitting the approval information indicating that the registration of the substitute person is permitted to the information processing apparatus 2000, and a URL for transmitting the approval information indicating that the registration of the substitute person is not permitted to the information processing apparatus 2000. The authorized picking-up person who receives the mail transmits the approval information by selecting any of the URLs.

Figure 8:
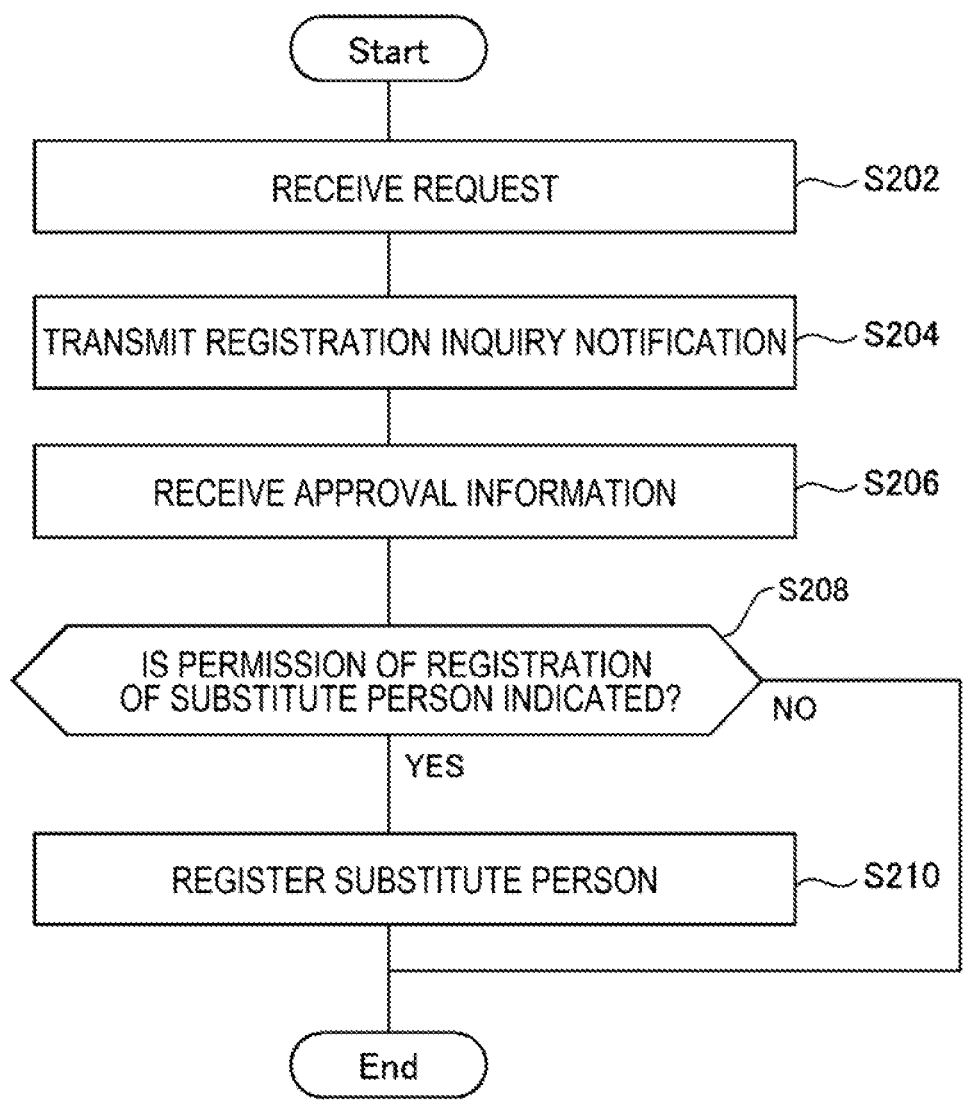
FIG. 8 is a flowchart illustrating a flow of process executed by the information processing apparatus in a case where the notification is transmitted before registration of a substitute person.

FIG. 8 is a flowchart illustrating a flow of process executed by the information processing apparatus 2000 in a case where the notification is transmitted before the registration of the substitute person. First, the registration unit 2020 receives the request (S202). Next, the notification unit 2040 transmits the registration inquiry notification to the authorized picking-up person associated with the picked-up target (S204). The registration unit 2020 receives the approval information (S206). The registration unit 2020 determines whether or not the approval information indicates that the registration of the substitute person is permitted (S208). In a case where the approval information indicates that the registration of the substitute person is permitted (S208: YES), the registration unit 2020 registers the substitute person (S210). On the other hand, in a case where the approval information does not indicate that the registration of the substitute person is permitted (S208: NO), the registration unit 2020 does not register the substitute person.

<Method of Determining Authorized Picking-Up Person>

In order for the notification unit 2040 to transmit the notification to the authorized picking-up person, it is necessary to determine the authorized picking-up person corresponding to the picked-up target. The notification unit 2040 determines the authorized picking-up person using the authorized picking-up person information.

Figure 9:
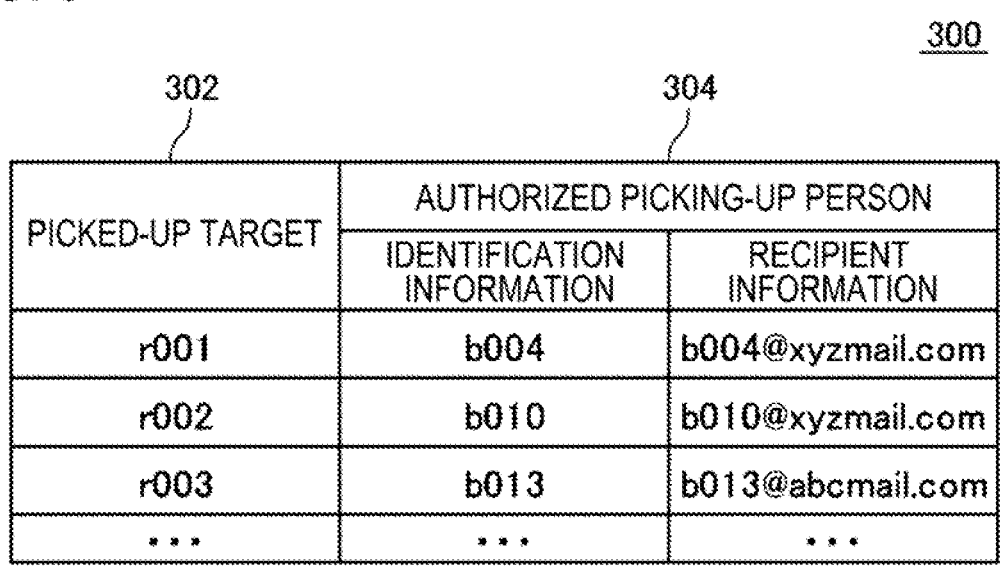
FIG. 9 is a diagram illustrating a structure of authorized picking-up person information in a table format.

FIG. 9 is a diagram illustrating a structure of the authorized picking-up person information in a table format. The table in FIG. 9 will be referred to as a table 300. The table 300 includes two columns of a picked-up target 302 and an authorized picking-up person 304. The picked-up target 302 shows the identification information of the picked-up target. The identification information of the picked-up target is described above. The authorized picking-up person 304 shows the identification information of the authorized picking-up person and recipient information (a mail address, terminal information used in PUSH delivery), or the like) in a case where the notification is transmitted to the authorized picking-up person. The authorized picking-up person 304 may show the recipient information as the identification information of the authorized picking-up person (that is, the recipient information may be used as the identification information).

Example Embodiment 2

For example, a functional configuration of the information processing apparatus 2000 of Example Embodiment 2 is shown in FIG. 2 in the same manner as the information processing apparatus 2000 of Example Embodiment 1. The information processing apparatus 2000 of Example Embodiment 2 has the same function as the information processing apparatus 2000 of Example Embodiment 1 except for the points described below.

In the present example embodiment, the request received by the registration unit 2020 includes image data in which the face image of the substitute person and a face image of the authorized picking-up person are included. Hereinafter, the image data will be referred to as a request image. For example, the request image is image data that is generated by imaging the authorized picking-up person and the substitute person together using a camera. In addition, the authorized picking-up person information of the present example embodiment includes the face image of the authorized picking-up person.

The registration unit 2020 of the present example embodiment obtains the face image of the substitute person using the request image. To do so, the registration unit 2020 compares each face image included in the request image with the face image of each authorized picking-up person included in the authorized picking-up person information. By doing so, the registration unit 2020 determines the face image of the authorized picking-up person from the face images included in the request image. Note that existing technologies can be used as a technology for comparing the acquired face images included in the image data with a preregistered face image of a person. Among the face images included in the request image, the registration unit 2020 handles the face image other than the determined face image of the authorized picking-up person as the face image of the substitute person.

In the present example embodiment, the identification information of the picked-up target may not be included in the request or be included in the request. In a case where the identification information of the picked-up target is not included in the request, the registration unit 2020 acquires, from the authorized picking-up person information storage unit 10, the identification information of the picked-up target that is associated with the face image of the authorized picking-up person obtained from the request image. The registration unit 2020 registers the substitute person by associating the face image of the substitute person with the acquired identification information of the picked-up target. By not including the identification information of the picked-up target in the request, a data size of the request can be reduced.

In a case where the identification information of the picked-up target is included in the request, the registration unit 2020 registers the substitute person by associating the face image of the substitute person with the identification information of the picked-up target included in the request. In this case, the registration unit 2020 may determine the face image of the authorized picking-up person from the face images included in the request image using the identification information of the picked-up target. Specifically, the registration unit 2020 acquires, from the authorized picking-up person information storage unit 10, the face image of the authorized picking-up person that is associated with the identification information of the picked-up target included in the request. The registration unit 2020 determines the face image of the authorized picking-up person from the face images included in the request image by comparing the acquired face image of the authorized picking-up person with each face image included in the request image.

By including the identification information of the picked-up target in the request, face images of the authorized picking-up person acquired from the authorized picking-up person information storage unit 10 can be narrowed down to one face image and can be compared one-to-one with the face image of the authorized picking-up person included in the request. Thus, comparison accuracy is improved. In addition, the amount of time required for the comparison can be reduced.

Figure 10:
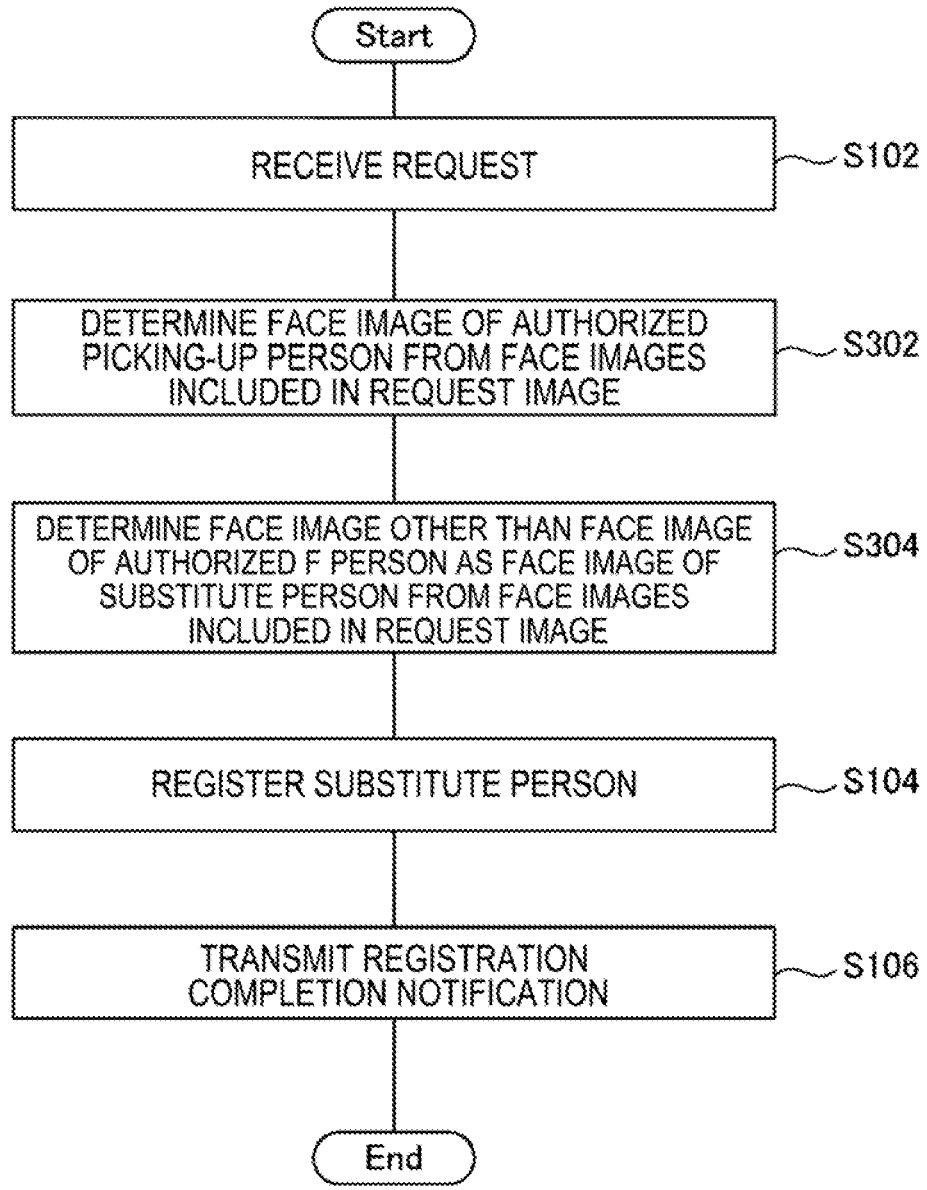
FIG. 10 is a first flowchart illustrating a flow of process executed by an information processing apparatus 2000 of Example Embodiment 2.

FIG. 10 is a first flowchart illustrating a flow of process executed by the information processing apparatus 2000 of Example Embodiment 2. The flowchart in FIG. 10 illustrates a flow of process in a case where the registration completion notification is transmitted by the notification unit 2040 of Example Embodiment 2. S102 to S106 in FIG. 10 correspond to S102 to S106 in FIG. 6, respectively.

After the request is received, the registration unit 2020 determines the face image of the authorized picking-up person from the face images included in the request image (S302). The registration unit 2020 determines the face image other than the face image of the authorized picking-up person as the face image of the substitute person from the face images included in the request image (S304). The registration unit 2020 registers the substitute person by associating the face image of the substitute person determined in S304 with the identification information of the picked-up target (S104).

Figure 11:
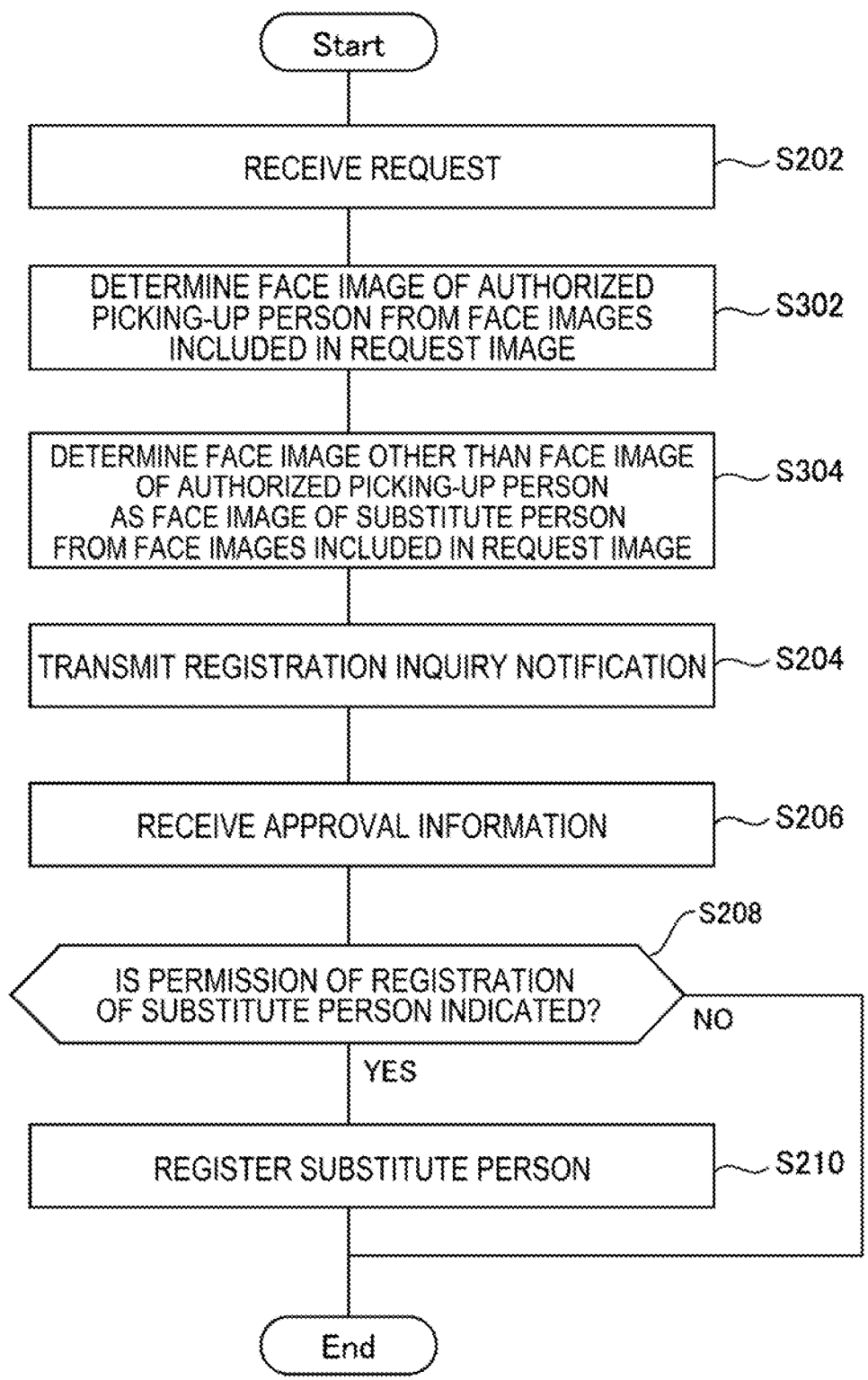
FIG. 11 is a second flowchart illustrating a flow of process executed by the information processing apparatus 2000 of Example Embodiment 2.

FIG. 11 is a second flowchart illustrating a flow of process executed by the information processing apparatus 2000 of Example Embodiment 2. The flowchart in FIG. 11 illustrates a flow of process in a case where the registration inquiry notification is transmitted by the notification unit 2040 of Example Embodiment 2. S30202 to S210 in FIG. 11 correspond to S202 to S210 in FIG. 8, respectively. In addition, S302 and S304 in FIG. 11 correspond to S302 and S304 in FIG. 10, respectively.

A plurality of face images of persons registered as an authorized picking-up person may be included in the request image. An example is a case where a substitute person of a certain picked-up target A is already registered as an authorized picking-up person of another picked-up target B. In this case, the registration unit 2020 needs to determine which face image of the face images included in the request image is the face image of the substitute person. Therefore, for example, the registration unit 2020 transmits a notification for selecting the face image of the substitute person to a terminal of a transmission source of the request. The substitute person responds to the notification by selecting the face image of the substitute person.

In addition, in a case where a plurality of face images of persons other than the person registered as the authorized picking-up person are included (that is, in a case where a plurality of substitute person candidates are included), the notification for selecting the face image of the substitute person may be transmitted in the same manner as above. That is, a person who is to be registered as the substitute person is selected from the substitute person candidates. By doing so, an image that includes persons other than the authorized picking-up person and the substitute person can be used as the request image. Thus, usability of a system is improved.

In addition, although a plurality of face images are included in the request image, no face image is determined from them as the authorized picking-up person. Example cases are that the substitute person transmits an erroneous request image, and that the face image of the authorized picking-up person included in the request image cannot be determined because the request image is not clear. In this case, the registration unit 2020 cannot determine the face image of the substitute person. Therefore, for example, the registration unit 2020 transmits a notification that the face image of the substitute person cannot be determined to the terminal of the transmission source of the request.

The request image may be designed such that a face image of the picked-up target has to be further included in addition to the face image of the authorized picking-up person and the face image of the substitute person. In this case, the face image of the picked-up target is included in the authorized picking-up person information. For example, the picked-up target in this case is a person or an animal (pet). An example is that the picked-up target is a child, the authorized picking-up person is a mother of the child, and the substitute person is a grandmother of the child. In this case, image data of a photograph in which these three persons are captured together can be used as the request image.

After the registration unit 2020 determines the face image of the authorized picking-up person included in the request image, the registration unit 2020 compares the face image of the picked-up target that is associated with the face image of the authorized picking-up person in the authorized picking-up person information, with each face image included in the request image. By doing so, the registration unit 2020 determines whether or not both of the face image of the authorized picking-up person and the face image of the picked-up target associated in the authorized picking-up person information are included in the request image. In a case where both of the face image of the authorized picking-up person and the face image of the picked-up target are included in the request image, the registration unit 2020 registers the substitute person. On the other hand, in a case where the face image of the picked-up target corresponding to the face image of the authorized picking-up person is not included in the request image, the registration unit 2020 does not register the substitute person.

Advantageous Effect

According to the information processing apparatus 2000 of the present example embodiment, by including and transmitting the image data in which the face of the authorized picking-up person and the face of the substitute person are included together in the request, the determination of the picked-up target and the acquisition of the face image of the substitute person can be implemented using the image data. Thus, the substitute person who desires to register the substitute person can request the registration of the substitute person using an easy method of transmitting image data of a photograph in which the substitute person is captured along with the authorized picking-up person. Accordingly, a burden of substitute person registration is reduced.

<Combination of Example Embodiment 1 and Example Embodiment 2>

The information processing apparatus 2000 may determine the number of face images included in the request image and determine whether to perform the process performed by the information processing apparatus 2000 of Example Embodiment 1 or the process performed by the information processing apparatus 2000 of Example Embodiment 2 depending on a determination result. In this case, the number of face images included in the request image may be one or a plural number.

Specifically, the registration unit 2020 operates as follows. First, the registration unit 2020 counts the number of face images included in the request image. In a case where the number of face images included in the request image is one, the registration unit 2020 performs the same process as the registration unit 2020 of Example Embodiment 1. On the other hand, in a case where the number of face images included in the request image is a plural number, the registration unit 2020 performs the same process as the registration unit 2020 of Example Embodiment 2.

Example Embodiment 3

Figure 12:
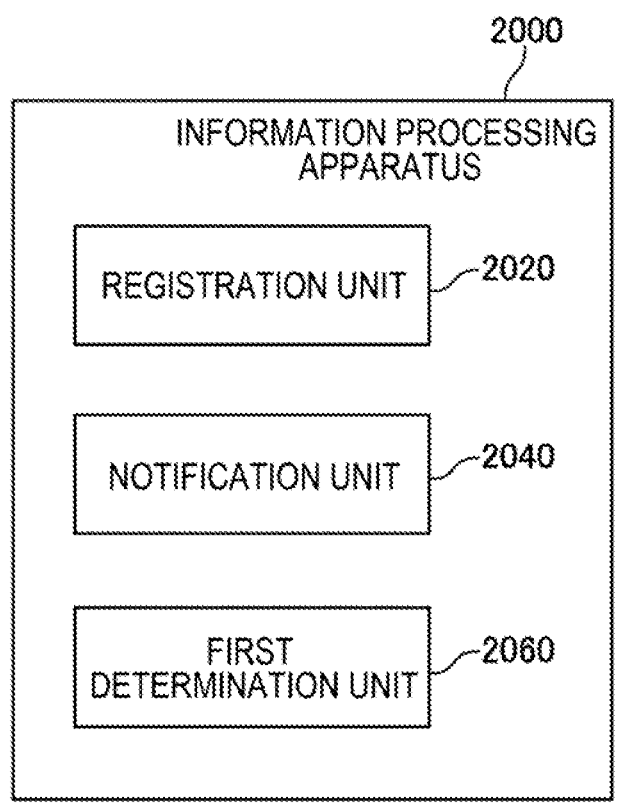
FIG. 12 is a block diagram illustrating a functional configuration of an information processing apparatus of Example Embodiment 3.

FIG. 12 is a block diagram illustrating a functional configuration of the information processing apparatus 2000 of Example Embodiment 3. The information processing apparatus 2000 of Example Embodiment 3 has the same function as the information processing apparatus 2000 of Example Embodiment 2 except for the points described below.

The information processing apparatus 2000 of Example Embodiment 3 includes a first determination unit 2060 that determines whether or not the request image included in the request received by the registration unit 2020 is a valid image. In a case where the request image is not a valid image, the registration unit 2020 does not register the substitute person. On the other hand, in a case where the request image is a valid image, the registration unit 2020 registers the substitute person. Note that, in a case where the registration unit 2020 receives the approval information from the authorized picking-up person, the registration unit 2020 registers the substitute person in a case where the request image is a valid image and the approval information indicates that the registration of the substitute person is permitted.

There are various methods of determining whether or not the request image is valid by the first determination unit 2060. For example, the first determination unit 2060 determines whether or not the request image is an image generated by a camera. In a case where the request image is an image generated by a camera, the first determination unit 2060 determines that the request image is valid. On the other hand, in a case where the request image is not an image generated by a camera, the first determination unit 2060 determines that the request image is not valid. In other words, in a case where the request image is image data generated using image processing software or the like, it is determined that the request image is not valid. Note that existing technologies can be used as a technology for determining whether certain image data is generated by a camera or is generated using image processing software or the like.

In another example, the first determination unit 2060 determines whether or not the request image is generated by compositing two or more different images. In a case where the request image is not generated by compositing two or more different images, the first determination unit 2060 determines that the request image is valid. On the other hand, in a case where the request image is generated by compositing two or more different images, the first determination unit 2060 determines that the request image is not valid. Note that existing technologies can be used as a technology for determining whether or not two or more pieces of image data are composited in certain image data.

Advantageous Effect

According to the information processing apparatus 2000 of the present example embodiment, a determination as to whether or not the request image is a valid image is performed, and the substitute person is registered depending on the determination result. By doing so, a case where a person not recognized as the substitute person of the picked-up target is registered as the substitute person by registering the substitute person using an invalid request image (for example, a request image generated by compositing individually imaged photographs of the substitute person and the authorized picking-up person) can be avoided. Thus, security of service provided by the information processing apparatus 2000 is increased.

Example Embodiment 4

Figure 13:
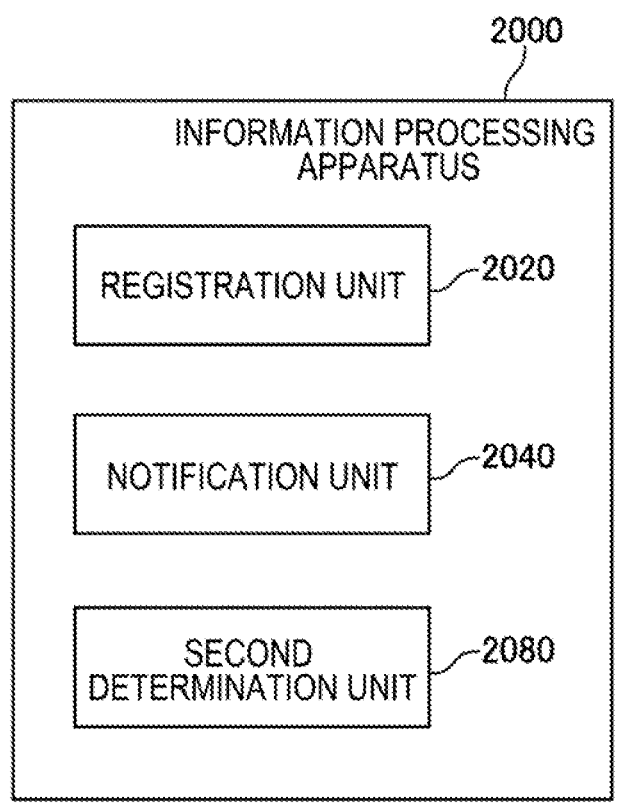
FIG. 13 is a block diagram illustrating a functional configuration of an information processing apparatus of Example Embodiment 4.

FIG. 13 is a block diagram illustrating a functional configuration of the information processing apparatus 2000 of Example Embodiment 4. The information processing apparatus 2000 of Example Embodiment 4 has the same function as the information processing apparatus 2000 of any of Example Embodiments 1 to 3 except for the points described below.

The information processing apparatus 2000 of Example Embodiment 4 has a function of determining whether or not a person who is about to pick up the picked-up target is the substitute person registered for the picked-up target. To do so, the information processing apparatus 2000 of Example Embodiment 4 includes a second determination unit 2080. The second determination unit 2080 acquires a captured image generated by a camera and determines whether or not a person included in the captured image is registered as the substitute person of the picked-up target.

The camera that generates the captured image acquired by the second determination unit 2080 is installed such that the substitute person who picks up the picked-up target is included in a capturing range. For example, the camera is installed near a location at which the picked-up target is handed over (for example, a ceiling above the location). For example, the location at which the picked-up target is handed over is a counter of a facility such as a nursery facility or a counter of a store such as a convenience store.

For example, a process performed by the second determination unit 2080 is as follows. The second determination unit 2080 extracts a face image from the acquired captured image. The second determination unit 2080 compares the extracted face image with the face image of each substitute person shown in the substitute person information. Note that existing technologies can be used as a technology for comparing the preregistered face image with the face image included in the captured image.

In a case where the face images of the substitute persons shown in the substitute person information include a face image similar to the face image included in the acquired captured image, the second determination unit 2080 determines that the person included in the captured image is registered as the substitute person. On the other hand, in a case where the face images of the substitute persons shown in the substitute person information do not include a face image of the substitute person similar to the face image included in the acquired captured image, the second determination unit 2080 determines that the person included in the captured image is not registered as the substitute person.

In a case where the person included in the captured image acquired by the second determination unit 2080 is registered as the substitute person, the second determination unit 2080 preferably outputs information (identification information, a name, or the like) of the picked-up target registered in association with the substitute person to an output device. For example, this information is displayed on a display device on which a person (hereinafter, staff) who hands the picked-up target over to the substitute person browses. The staff obtains information (identification information or the like) of the picked-up target to be picked up from the substitute person visiting the store or the like. For example, the substitute person verbally tells the identification information, the name, or the like of the picked-up target to the staff. The staff checks whether or not the information of the picked-up target displayed on the display device by the second determination unit 2080 matches the information obtained from the substitute person. In a case where the information matches, the staff hands the picked-up target over to the substitute person. On the other hand, in a case where the information does not match, the staff does not hand the picked-up target over to the substitute person.

The information of the picked-up target may be input into the information processing apparatus 2000 using an input device. In this case, for example, the second determination unit 2080 determines whether or not the input information of the picked-up target matches the information of the picked-up target obtained from the substitute person information and outputs a determination result. In a case where the output determination result shows that the information of the picked-up target input by the substitute person matches the information of the picked-up target obtained from the substitute person information, the staff hands the picked-up target over to the substitute person. On the other hand, in a case where the output determination result does not show that the information matches, the staff does not hand the picked-up target over to the substitute person.

Note that in a case where the identification information of the picked-up target is input using the input device, the second determination unit 2080 may acquire the face image of the substitute person registered in association with the input identification information from the substitute person information storage unit and compare the acquired face image with the face image included in the captured image generated by the camera. The second determination unit 2080 outputs a comparison result (whether or not the face images match) to the output device. According to this method, it is not necessary to compare the face image included in the captured image with the face images of all substitute persons stored in the substitute person information storage unit in a brute-force manner. Thus, the amount of time required for performing the determination process by the second determination unit 2080 is reduced.

In addition, in a case where the identification information of the picked-up target is input using the input device, the information processing apparatus 2000 may acquire the face image of the substitute person registered in association with the input identification information from the substitute person information storage unit and output the acquired face image to the output device. In this case, for example, the staff visually compares the output face image of the substitute person with a face of a person who comes to pick up the picked-up target. In a case where it is determined that the face of the person who comes to pick up the picked-up target matches the face image of the substitute person, the staff hands the picked-up target over. Note that in this case, the information processing apparatus 2000 may not include the second determination unit 2080.

While the example embodiments of the present invention are described thus far with reference to the drawings, the example embodiments are illustrations of the present invention. Various configurations other than those described above can be employed.

A part or all of the example embodiments may be described as in the following appendix but are not limited thereto.

1. An information processing apparatus including a registration unit that receives a request including a face image of a substitute person who picks up a picked-up target as a substitute, and registers the substitute person in association with the picked-up target, and a notification unit that determines an authorized picking-up person associated with the picked-up target to be associated with the substitute person using an authorized picking-up person information storage unit which stores the picked-up target in association with the authorized picking-up person of the picked-up target, and transmits a notification related to registration of the substitute person to the authorized picking-up person.

2. The information processing apparatus according to 1, in which the notification includes the face image of the substitute person.

3. The information processing apparatus according to 1 or 2, in which the registration unit receives approval information indicating whether or not to permit registration of the substitute person from the authorized picking-up person and registers the substitute person in a case where the approval information indicates that registration of the substitute person is permitted.

4. The information processing apparatus according to any one of 1 to 3, in which a face image of the authorized picking-up person is stored in the authorized picking-up person information storage unit, the request includes a request image in which face images of two or more persons are included, and the registration unit determines the face image of the authorized picking-up person stored in the authorized picking-up person information storage unit from the face images included in the request image, determines the picked-up target associated with the determined face image of the authorized picking-up person in the authorized picking-up person information storage unit, and registers a face image other than the face image of the authorized picking-up person included in the request image as the face image of the substitute person in association with the determined picked-up target.

5. The information processing apparatus according to any one of 1 to 3, in which a face image of the authorized picking-up person is stored in association with identification information of the picked-up target in the authorized picking-up person information storage unit, the request includes a request image in which face images of two or more persons are included, and the identification information of the picked-up target, and the registration unit acquires the face image of the authorized picking-up person associated with the identification information of the picked-up target included in the request from the authorized picking-up person information storage unit, determines the face image of the authorized picking-up person included in the request image using the acquired face image of the authorized picking-up person, and registers a face image other than the face image of the authorized picking-up person included in the request image as the face image of the substitute person in association with the identification information of the picked-up target included in the request.

6. The information processing apparatus according to 4 or 5, in which the registration unit determines whether or not a face image of the determined picked-up target is further included in the request image, and registers the substitute person in a case where the face image of the determined picked-up target is included in the request image.

7. The information processing apparatus according to any one of 4 to 6, further including a determination unit that determines whether or not the request image is a valid image, in which in a case where the request image is not a valid image, the registration unit does not register the substitute person.

8. The information processing apparatus according to 7, in which in a case where the request image is not an image generated by a camera, the determination unit determines that the request image is not valid.

9. The information processing apparatus according to 7 or 8, in which in a case where the request image is generated by compositing two or more different images, the determination unit determines that the request image is not valid.

10. The information processing apparatus according to any one of 1 to 9, further including a second determination unit that acquires a captured image and determines whether or not a person included in the acquired captured image is registered as the substitute person for pickup of the picked-up target.

11. The information processing apparatus according to 10, in which in a case where the person included in the acquired captured image is registered as the substitute person for pickup of the picked-up target, the second determination unit outputs information related to the picked-up target associated with the substitute person to an output device.

12. A control method executed by a computer, including a registration step of receiving a request including a face image of a substitute person who picks up a picked-up target as a substitute, and registering the substitute person in association with the picked-up target, and a notification step of determining an authorized picking-up person associated with the picked-up target to be associated with the substitute person using an authorized picking-up person information storage unit which stores the picked-up target in association with the authorized picking-up person of the picked-up target, and transmitting a notification related to registration of the substitute person to the authorized picking-up person.

13. The control method according to 12, in which the notification includes the face image of the substitute person.

14. The control method according to 12 or 13, in which in the registration step, approval information indicating whether or not to permit registration of the substitute person is received from the authorized picking-up person, and the substitute person is registered in a case where the approval information indicates that registration of the substitute person is permitted.

15. The control method according to any one of 12 to 14, in which a face image of the authorized picking-up person is stored in the authorized picking-up person information storage unit, the request includes a request image in which face images of two or more persons are included, and in the registration step, the face image of the authorized picking-up person stored in the authorized picking-up person information storage unit is determined from the face images included in the request image, the picked-up target associated with the determined face image of the authorized picking-up person in the authorized picking-up person information storage unit is determined, and a face image other than the face image of the authorized picking-up person included in the request image is registered as the face image of the substitute person in association with the determined picked-up target.

16. The information processing apparatus according to any one of 12 to 14, in which a face image of the authorized picking-up person is stored in association with identification information of the picked-up target in the authorized picking-up person information storage unit, the request includes a request image in which face images of two or more persons are included, and the identification information of the picked-up target, and in the registration step, the face image of the authorized picking-up person associated with the identification information of the picked-up target included in the request is acquired from the authorized picking-up person information storage unit, the face image of the authorized picking-up person included in the request image is determined using the acquired face image of the authorized picking-up person, and a face image other than the face image of the authorized picking-up person included in the request image is registered as the face image of the substitute person in association with the identification information of the picked-up target included in the request.

17. The control method according to 15 or 16, in which in the registration step, whether or not a face image of the determined picked-up target is further included in the request image is determined, and the substitute person is registered in a case where the face image of the determined picked-up target is included in the request image.

18. The control method according to any one of 15 to 17, further including a determination step of determining whether or not the request image is a valid image, in which in the registration step, in a case where the request image is not a valid image, the substitute person is not registered.

19. The control method according to 18, in which in the determination step, in a case where the request image is not an image generated by a camera, it is determined that the request image is not valid.

20. The control method according to 18 or 19, in which in the determination step, in a case where the request image is generated by compositing two or more different images, it is determined that the request image is not valid.

21. The control method according to any one of 12 to 20, further including a second determination step of acquiring a captured image and determining whether or not a person included in the acquired captured image is registered as the substitute person for pickup of the picked-up target.

22. The control method according to 21, in which in the second determination step, in a case where the person included in the acquired captured image is registered as the substitute person for pickup of the picked-up target, information related to the picked-up target associated with the substitute person is output to an output device.

23. A program causing a computer to implement each step of the control method according to any one of 12 to 22.

This application claims the benefit of priority from Japanese Patent Application No. 2017-151377 filed on Aug. 4, 2017, the entire disclosure of which is incorporated herein.

The invention claimed is:
1. An information processing apparatus comprising:
a memory configured to store instructions; and
a processor configured to execute the instructions to:
receive a request from a substitute person who picks up a picked-up target as a substitute, and register the substitute person in association with the picked-up target; and
determine an authorized picking-up person associated with the picked-up target using an authorized picking-up person information storage unit which stores the picked-up target in association with the authorized picking-up person of the picked-up target, and transmit a notification related to registration of the substitute person to the authorized picking-up person, wherein a face image of the authorized picking-up person is stored in the authorized picking-up person information storage unit,
the request includes a request image in which face images of two or more persons are included, and
the processor is further configured to perform:
determining the face image of the authorized picking-up person stored in the authorized picking-up person information storage unit from the face images included in the request image;
determining the picked-up target associated with the determined face image of the authorized picking-up person in the authorized picking-up person information storage unit; and
registering a face image other than the face image of the authorized picking-up person included in the request image as the face image of the substitute person in association with the determined picked-up target.

2. The information processing apparatus according to claim 1,
wherein the request and the notification includes the face image of the substitute person.

3. The information processing apparatus according to claim 1,
wherein the processor is further configured to execute the one or more instructions to receive approval information indicating whether or not to permit registration of the substitute person from the authorized picking-up person, and register the substitute person in a case where the approval information indicates that registration of the substitute person is permitted.

4. The information processing apparatus according to claim 1,
wherein the processor is further configured to execute the one or more instructions to determine whether or not a face image of the determined picked-up target is further included in the request image, and register the substitute person in a case where the face image of the determined picked-up target is included in the request image.

5. The information processing apparatus according to claim 1,
wherein the processor is further configured to execute the one or more instructions to:
determine whether or not the request image is a valid image, and
in a case where the request image is not a valid image, not register the substitute person.

6. The information processing apparatus according to claim 5,
wherein the processor is further configured to execute the one or more instructions to determine that the request image is not valid in a case where the request image is not an image generated by a camera.

7. The information processing apparatus according to claim 5,
wherein the processor is further configured to execute the one or more instructions to determine that the request image is not valid in a case where the request image is generated by compositing two or more different images.

8. The information processing apparatus according to claim 1,
acquire a captured image and determine whether or not a person included in the acquired captured image is registered as the substitute person for pickup of the picked-up target,
wherein the request includes a face image of the substitute person.

9. The information processing apparatus according to claim 8,
wherein the processor is further configured to execute the one or more instructions to output information related to the picked-up target associated with the substitute person to an output device in a case where the person included in the acquired captured image is registered as the substitute person for pickup of the picked-up target.

10. An information processing apparatus comprising:
a memory configured to store instructions; and
a processor configured to execute the instructions to:
receive a request from a substitute person who picks up a picked-up target as a substitute, and register the substitute person in association with the picked-up target; and
determine an authorized picking-up person associated with the picked-up target using an authorized picking-up person information storage unit which stores the picked-up target in association with the authorized picking-up person of the picked-up target, and transmit a notification related to registration of the substitute person to the authorized picking-up person,
wherein a face image of the authorized picking-up person is stored in association with identification information of the picked-up target in the authorized picking-up person information storage unit,
the request includes a request image in which face images of two or more persons are included, and the identification information of the picked-up target, and
the processor is further configured to perform:
acquiring the face image of the authorized picking-up person associated with the identification information of the picked-up target included in the request from the authorized picking-up person information storage unit;
determining the face image of the authorized picking-up person included in the request image using the acquired face image of the authorized picking-up person; and
registering a face image other than the face image of the authorized picking-up person included in the request image as the face image of the substitute person in association with the identification information of the picked-up target included in the request.

11. The information processing apparatus according to claim 10,
wherein the request and the notification includes the face image of the substitute person.

12. The information processing apparatus according to claim 10,
wherein the processor is further configured to execute the one or more instructions to receive approval information indicating whether or not to permit registration of the substitute person from the authorized picking-up person, and register the substitute person in a case where the approval information indicates that registration of the substitute person is permitted.

13. The information processing apparatus according to claim 10,
wherein the processor is further configured to execute the one or more instructions to determine whether or not a face image of the determined picked-up target is further included in the request image, and register the substitute person in a case where the face image of the determined picked-up target is included in the request image.

14. The information processing apparatus according to claim 10,
wherein the processor is further configured to execute the one or more instructions to:
determine whether or not the request image is a valid image, and
in a case where the request image is not a valid image, not register the substitute person.

15. The information processing apparatus according to claim 14,
wherein the processor is further configured to execute the one or more instructions to determine that the request image is not valid in a case where the request image is not an image generated by a camera.

16. The information processing apparatus according to claim 14,
wherein the processor is further configured to execute the one or more instructions to determine that the request image is not valid in a case where the request image is generated by compositing two or more different images.

17. The information processing apparatus according to claim 10,
acquire a captured image and determine whether or not a person included in the acquired captured image is registered as the substitute person for pickup of the picked-up target,
wherein the request includes a face image of the substitute person.

18. The information processing apparatus according to claim 17,
wherein the processor is further configured to execute the one or more instructions to output information related to the picked-up target associated with the substitute person to an output device in a case where the person included in the acquired captured image is registered as the substitute person for pickup of the picked-up target.

19. A control method executed by a computer, comprising:
receiving a request from a substitute person who picks up a picked-up target as a substitute, and registering the substitute person in association with the picked-up target; and
determining an authorized picking-up person associated with the picked-up target to be associated with the substitute person using an authorized picking-up person information storage unit which stores the picked-up target in association with the authorized picking-up person of the picked-up target, and transmitting a notification related to registration of the substitute person to the authorized picking-up person,
wherein a face image of the authorized picking-up person is stored in the authorized picking-up person information storage unit,
the request includes a request image in which face images of two or more persons are included, and
the method further comprising:
determining the face image of the authorized picking-up person stored in the authorized picking-up person information storage unit from the face images included in the request image;
determining the picked-up target associated with the determined face image of the authorized picking-up person in the authorized picking-up person information storage unit; and
registering a face image other than the face image of the authorized picking-up person included in the request image as the face image of the substitute person in association with the determined picked-up target.

20. The control method according to claim 19,
wherein the request and the notification includes the face image of the substitute person.

21. The control method according to claim 19, further comprising:
receiving approval information indicating whether or not to permit registration of the substitute person from the authorized picking-up person, and registering the substitute person in a case where the approval information indicates that registration of the substitute person is permitted.

22. The control method according to claim 19, further comprising:
determining whether or not a face image of the determined picked-up target is further included in the request image, and registering the substitute person in a case where the face image of the determined picked-up target is included in the request image.

23. The control method according to claim 19, further comprising:
determining whether or not the request image is a valid image,
wherein the substitute person is not registered in a case where the request image is not a valid image.

24. The control method according to claim 23, further comprising:
determining that the request image is not valid in a case where the request image is not an image generated by a camera.

25. The control method according to claim 23,
wherein determining that the request image is not valid in a case where the request image is generated by compositing two or more different images.

26. The control method according to claim 19, further comprising:
acquiring a captured image and determining whether or not a person included in the acquired captured image is registered as the substitute person for pickup of the picked-up target.

27. The control method according to claim 26, further comprising:
outputting information related to the picked-up target associated with the substitute person-to an output device in a case where the person included in the acquired captured image is registered as the substitute person for pickup of the picked-up target,
wherein the request includes a face image of the substitute person.

28. A non-transitory computer-readable storage medium storing a program causing a computer to execute the control method according to claim 19.

29. A control method executed by a computer, comprising:
receiving a request from a substitute person who picks up a picked-up target as a substitute, and registering the substitute person in association with the picked-up target; and
determining an authorized picking-up person associated with the picked-up target using an authorized picking-up person information storage unit which stores the picked-up target in association with the authorized picking-up person of the picked-up target, and transmitting a notification related to registration of the substitute person to the authorized picking-up person,
wherein a face image of the authorized picking-up person is stored in association with identification information of the picked-up target in the authorized picking-up person information storage unit,
the request includes a request image in which face images of two or more persons are included, and the identification information of the picked-up target, and
the method further comprising:
acquiring the face image of the authorized picking-up person associated with the identification information of the picked-up target included in the request from the authorized picking-up person information storage unit;

determining the face image of the authorized picking-up person included in the request image using the acquired face image of the authorized picking-up person; and registering a face image other than the face image of the authorized picking-up person included in the request image as the face image of the substitute person in association with the identification information of the picked-up target included in the request.

30. The control method according to claim 29, wherein the request and the notification includes the face image of the substitute person.

31. The control method according to claim 29, further comprising:

receiving approval information indicating whether or not to permit registration of the substitute person from the authorized picking-up person, and registering the substitute person in a case where the approval information indicates that registration of the substitute person is permitted.

32. The control method according to claim 29, further comprising:

determining whether or not a face image of the determined picked-up target is further included in the request image, and registering the substitute person in a case where the face image of the determined picked-up target is included in the request image.

33. The control method according to claim 29, further comprising:

determining whether or not the request image is a valid image, wherein the substitute person is not registered in a case where the request image is not a valid image.

34. The control method according to claim 33, further comprising:

determining that the request image is not valid in a case where the request image is not an image generated by a camera.

35. The control method according to claim 33, wherein determining that the request image is not valid in a case where the request image is generated by compositing two or more different images.

36. The control method according to claim 29, further comprising:

acquiring a captured image and determining whether or not a person included in the acquired captured image is registered as the substitute person for pickup of the picked-up target.

37. The control method according to claim 36, further comprising:

outputting information related to the picked-up target associated with the substitute person-to an output device in a case where the person included in the acquired captured image is registered as the substitute person for pickup of the picked-up target, wherein the request includes a face image of the substitute person.

38. A non-transitory computer-readable storage medium storing a program causing a computer to execute the control method according to claim 29.

* * * * *